United States Patent
Bönsch et al.

(10) Patent No.: US 8,424,446 B2
(45) Date of Patent: Apr. 23, 2013

(54) FROTHING DEVICE

(75) Inventors: Torsten Bönsch, Geislingen/Steige (DE); Sander Dollner, Ulm-Wiblingen (DE); Jochen Gussmann, Schwäbisch-Gmund (DE); Alexander Kiefer, Kuchen (DE)

(73) Assignee: WMF Wurttenbergische Metallwarenfabrik AG (DE)

( * ) Notice: Subject to any disclaimer, the term of this patent is extended or adjusted under 35 U.S.C. 154(b) by 393 days.

(21) Appl. No.: 12/726,416

(22) Filed: Mar. 18, 2010

(65) Prior Publication Data
US 2010/0236416 A1    Sep. 23, 2010

(30) Foreign Application Priority Data
Mar. 19, 2009   (DE) .................... 10 2009 013 937

(51) Int. Cl.
*A47J 31/40*    (2006.01)
(52) U.S. Cl.
USPC ........................................... 99/293; 99/323.1
(58) Field of Classification Search .................. 99/293, 99/323.1, 302 R
See application file for complete search history.

(56) References Cited

U.S. PATENT DOCUMENTS

| | | | | |
|---|---|---|---|---|
| 4,922,810 A | * | 5/1990 | Siccardi | 99/323.1 |
| 6,006,654 A | * | 12/1999 | Pugh | 99/293 |
| 6,289,796 B1 | * | 9/2001 | Fung | 99/453 |
| 7,600,467 B2 | * | 10/2009 | Coccia et al. | 99/293 |
| 2009/0092728 A1 | * | 4/2009 | Coccia et al. | 426/569 |
| 2009/0314167 A1 | * | 12/2009 | De Graaff et al. | 99/295 |
| 2010/0236416 A1 | * | 9/2010 | Bonsch et al. | 99/280 |

OTHER PUBLICATIONS

European Search Report for EP-10156752.7.

* cited by examiner

*Primary Examiner* — Raleigh W. Chiu
(74) *Attorney, Agent, or Firm* — Rader, Fishman & Grauer PLLC

(57) ABSTRACT

The present invention relates to a frothing device for the frothing of milk, comprising a steam supply channel which opens into a mixing chamber, a milk supply channel which opens into the mixing chamber and comprising an air supply channel, wherein the mixing chamber is connected in communication with a froth chamber. It is essential to the invention that the air supply channel opens into the froth chamber, with the result that an almost identical dispensing temperature of milk froth and milk can be achieved.

20 Claims, 1 Drawing Sheet

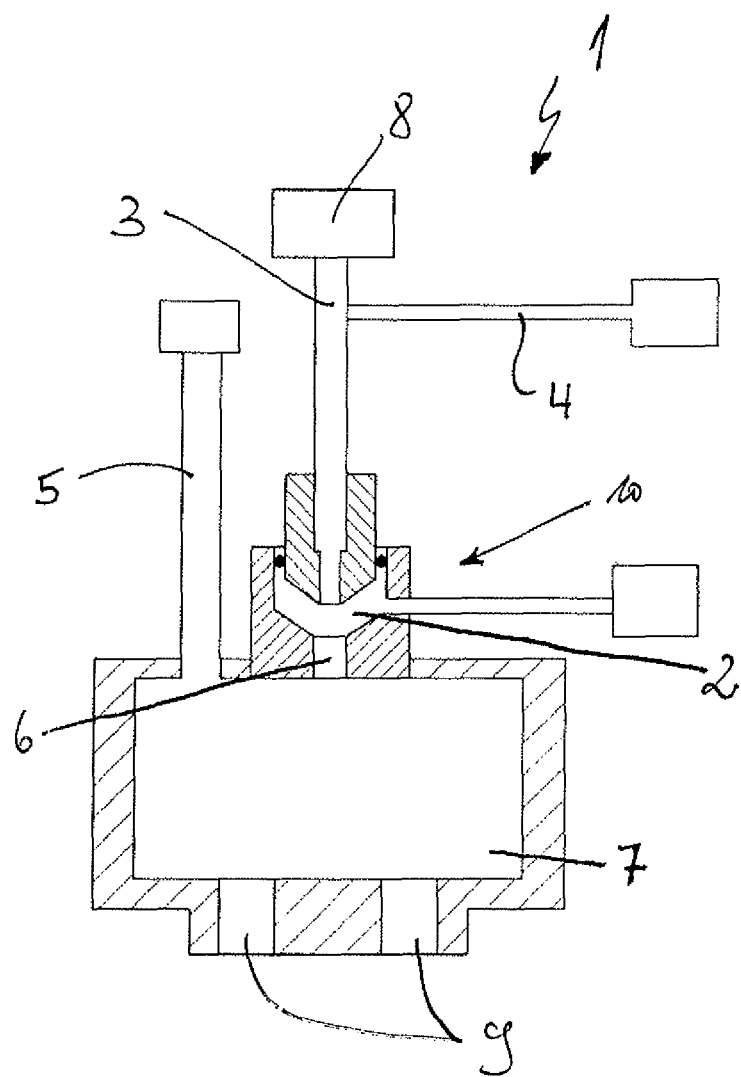

FROTHING DEVICE this application claims priority to German patent application DE10 2009 013 937.0 filed on Mar. 19,2009, which is hereby incorporated by reference in its entirety.

TECHNICAL FIELD

The present invention relates to a frothing device for the frothing of milk for the preparation of, for example, a Cappuccino. The invention also relates to a coffee machine with such a frothing device.

BACKGROUND

A generic frothing device is known, for example, from DE 44 45 436 C2, this frothing device having a supply pipe for steam, a supply pipe for air and a supply pipe for milk in a mixing region. The supply pipe for the air is in this case connected to a compressed air source for blowing in air, the blowing in of the air itself being controllable. This is in particular intended to achieve an improved air input at the beginning of the frothing process and consequently improved frothing properties.

In addition to the known frothing device, systems are also known which can also produce and dispense hot milk by switching off an air supply. In this case, however, the temperature is always lower than that of the froth (milk-air mixture) since more mass must be heated in the same time. This is counteracted, for example, by separate devices limiting the milk flow or additionally releasing steam pipes. However, such additional devices require installation space and incur additional costs with the result that, in particular, the requirement for compact and inexpensive equipment can no longer be satisfied. In general, known frothing devices have a number of shortcomings so that, for example, a ratio of air to amount of milk depends on the steam pressure and as a result, an evaluation of the steam pressure and an adaptation of the conveyed amount of air cannot be achieved cost-effectively. Furthermore, a satisfactory frothing result cannot be achieved with the known frothing devices insofar as the air at constant pressure is introduced into the steam pipe with fluctuating pressure. In addition, in cold frothing devices relatively too much air is frequently conveyed in the pipe with the result that a Venturi process does not even get started. This effect is still further exacerbated by the condensate present in the steam pipes.

The present invention is concerned with the problem of providing an improved or at least an alternative embodiment for a frothing device of the generic type in which milk froth having a high temperature and a fine-pored stable consistency or hot milk whose temperature corresponds to that of the milk froth can be produced.

SUMMARY

This problem is achieved according to the invention by the subject matters of the independent claims. Advantageous embodiments are the subject matter of the dependent claims.

The present invention is based on the general idea that in a frothing device for the frothing of milk for the preparation of, for example, Cappuccino, comprising a mixing chamber and an adjoining froth chamber, a steam supply channel and a milk supply channel are made to open into the mixing chamber whereas an air supply channel opens directly into the froth chamber. Contrary to previous assumptions, it has been shown in this case that the air required for frothing the milk can be introduced for the first time into the ready-heated milk and need not be pressed from the mixing chamber into the froth chamber jointly with the hot milk. If a Venturi effect is used for example for conveying and heating the milk, this can, for example, be set exactly to a specific mass flow and therefore to a desired increase in temperature. Alternatively to this, it is also feasible that warm milk is supplied to the mixing chamber by means of a corresponding pump. With the frothing device according to the invention, it is therefore possible extremely simply to alternatively produce hot milk or hot milk froth which can both be poured from the froth chamber into a drinking vessel via a common outlet. The production of hot milk can therefore be achieved by a comparatively simple switch-off of the air supply to the froth chamber, the air supply being activated again when milk froth is desired. Another major advantage of the frothing device according to the invention is that a temperature level of the milk froth to be produced or of the milk to be dispensed can overall be set higher since no consideration needs to be given to any interaction between steam pressure and air flow. In addition, a conveying process proceeds considerably more stably even at the beginning since the air flow does not cause additional disturbance. A temperature difference remaining between frothed and non-frothed milk is conceivably small in this case since always this same mass of milk is heated under otherwise the same conditions.

In an advantageous further development of the solution according to the invention, an air supply to the froth chamber can not only be switched off but is in particular also controllable/adjustable. By this means, the milk froth to be produced can in particular be individually influenced, in particular with regard to its consistency. The controllability/adjustability can be achieved in this case, for example, by means of a suitable valve device in the air supply channel, this being instructed by means of a suitable control/regulating device. The froth fraction can thus be varied almost arbitrarily by controlling or regulating the air supply so that in particular the production of layered drinks such as, for example, a latte macchiato, can be accomplished particularly simply. The fine-pored nature of the milk froth can furthermore be adjusted by varying the air flow, wherein inexpensive air pumps can additionally be used since no compromise needs to be found between a low discharge rate and a high counter-pressure unlike in the hitherto known frothing devices.

In a further advantageous further development of the solution according to the invention, alternatively also a steam-air mixture, only steam, only water, a flavouring agent such as, for example, cocoa powders, or a cleaning agent can be supplied to the froth chamber via the air supply channel. In particular, the addition of drinks powders such as, for example, cocoa powder directly into the froth chamber allows such mixed drinks to be produced easily. By supplying cleaning agents into the froth chamber via the air supply channel, this can be effectively cleaned and for example, freed from milk residues. A pure supply of steam via the air supply channel is also advantageous since the froth chamber can be cleaned perfectly hygienically by this means, for example, after use.

Further important features and advantages of the invention are obtained from the dependent claims, from the drawing and from the relevant description of the figures with reference to the drawing.

It is understood that the features specified previously and to be explained hereinafter can be used not only in the respectively given combination but also in other combinations or alone without departing from the framework of the present invention.

A preferred exemplary embodiment of the invention is shown in the drawing and will be explained in detail in the following description.

BRIEF DESCRIPTION OF THE DRAWING

The single FIG. 1 shows a sectional view through a frothing device according to the invention.

DETAILED DESCRIPTION

In accordance with FIG. 1, a frothing device 1 according to the invention for frothing milk for the preparation in particular of a Cappuccino beverage comprises a steam supply channel 3 which opens into a mixing chamber 2, a milk supply channel 4 which likewise opens into the mixing chamber 2 as well as an air supply channel 5. The mixing chamber 2 is in this case connected to a froth chamber 7 in a communicating manner, for example, via a hole 6 configured as a nozzle. According to the invention, the air supply channel 5 now opens directly into the froth chamber 7, wherein an inlet of the air supply channel 5 into the froth chamber 7 can be selected at a freely selectable, in particular constructively favourable location. According to the diagram in FIG. 1, the air supply channel 5 runs parallel to the hole 6 and enters from above into the froth chamber 7. By this means it is possible to produce milk froth having a high temperature and fine-pored stable consistency, wherein hot milk whose temperature corresponds to that of the milk froth can also be produced with the same frothing device 1, merely by switching off or blocking the air supply channel 5.

Contrary to previous assumptions, it has been shown in this case that the air required for frothing the milk can be introduced for the first time into the ready-heated milk in the froth chamber 7 and need not be introduced jointly with the hot milk into the mixing chamber 2 and then pressed through the hole 6 into the froth chamber 7. If a Venturi effect is used for example for conveying and heating the milk, this can be set exactly to a specific mass flow and therefore to the desired increase in temperature. Naturally, it is also feasible that warm milk is supplied by means of a corresponding pump, not shown. In general, the hole 6 can, as mentioned above, be configured as a nozzle and therefore also as an accelerating hole.

In this case, an air supply to the froth chamber 7 via the air supply channel 6 is preferably controllable or adjustable with the result that a froth fraction can be varied almost arbitrarily by adjusting the air supply, which is in particular of great advantage for preparing currently popular layered drinks such as, for example, a latte macchiato. In addition, the pore volume of the milk froth can be adjusted by a varied air supply to the froth chamber 7, wherein in particular inexpensive air pumps can be used since no compromise needs to be found between a low discharge rate and a high counter-pressure (steam) unlike in the hitherto known systems.

It is of particular advantage in the invention that the temperature level of the milk froth and the froth itself can overall be set higher since no consideration needs to be give to the interactions between steam pressure and air flow. In addition, the conveying process proceeds considerably more stably at the beginning since the air flow does not cause additional disturbance in the mixing chamber 2. Due to the frothing device 1 according to the invention, a temperature difference between frothed and unfrothed milk can be significantly reduced since the same mass of milk is always heated under otherwise the same conditions.

A pressure source 8, in particular a steam pressure source or a compressed air source, for example, can be provided for cleaning the steam supply channel 3. In addition, such a pressure source 8 prevents milk being sucked back into the steam supply pipe 3. At the same time, dripping of milk can be minimised by this means and milk residue can be better blown out from the froth chamber 7. In addition, another pressure source 10 (e.g. air) can be provided for emptying the pipes. In this case, the froth chamber 7 can have one or arbitrarily many outlets 9 into the open air, two outlets 9 being shown in FIG. 1. It is also feasible that a steam-air mixture, only steam, only water, a flavouring such as, for example, cocoa powder or a cleaning agent can be fed into the froth chamber 7 via the air supply channel 5. As a result, the dispensing of milk drinks such as, for example, drinking chocolate can be achieved particularly simply. At the same time, cleaning of the frothing device 1 can be made easier since in particular a mixture of cleaning agent and hot steam, supplied through the air supply channel 5, achieves a high cleaning effect.

A control/regulating device not shown can be provided, for example, for controlling or regulating an air supply to the froth chamber 7, which device controls or regulates the air supply to the froth chamber 7 in particular as a function of a boiler pressure and/or an operating state of a heating device likewise not shown. In general it is also feasible, for example, to supply water to the froth chamber 7 during dosing in order in particular to vary the density of the milk and thereby make it easier to prepare layered drinks such as, for example, latte macchiato. In addition, at the end of the product preparation, water, for example, can also be fed into the froth chamber 7 in order for example to avoid the formation of air bubbles at the end of the froth process and/or to free the froth chamber 7 from milk residues.

In addition, it is feasible for the frothing device 1 to have a two-stage ejector pump 10, wherein the mixing chamber with the steam supply channel 3 opening therein and the milk supply channel 4 forms the first stage, which is followed by the froth chamber 7 with the air supply channel opening therein and thereby forms the second stage. Through the two-stage configuration of the ejector pump 10, the air, required for frothing the milk need not extract in the first stage of the ejector pump 10, that is in the region of the mixing chamber 2, jointly with the milk, but a vacuum is produced by the milk itself in the second stage, that is in the froth chamber 7 and the air is thereby extracted. By this means it is possible to always heat the same mass flow in the first case, the air being entrained by the already-heated milk jet when dispensing frothed milk. As a result of such an embodiment, an almost identical dispensing temperature of frothed and non-frothed milk can be achieved, the structure of the ejector pump 10 shown according to FIG. 1 being constructively simple and as a result inexpensive and at the same time, it can be easily cleaned. Compared to systems known from the prior art, in which, for example, the air is extracted jointly with the milk with the aid of a steam jet pump, the frothing device 1 according to the invention has the major advantage that the temperature of frothed and unfrothed milk almost no longer differs when dispensed since in general no differently-sized mass flows need to be heated.

The invention claimed is:
1. A frothing device comprising:
a steam supply channel, which opens into a mixing chamber; a milk supply channel, which opens into the mixing chamber and an air supply channel, which opens into a froth chamber, wherein the mixing chamber is in communication with the froth chamber; and further comprising a two-stage ejector pump, wherein the first stage occurs when the steam supply channel opens into the mixing chamber and the milk supply channel, and the second stage occurs with the air supply channel opening into the froth chamber.

2. The frothing device according to claim 1, wherein an accelerating hole connects the mixing chamber to the froth chamber.

3. The frothing device according to claim 2, wherein an adjustable air supply is provided to the froth chamber through the air supply channel.

4. The frothing device according to claim 1, wherein an adjustable air supply is provided to the froth chamber.

5. The frothing device according to claim 1, wherein a pressure source -is provided for blowing free each of the steam supply channel and the adjustable air supply.

6. The frothing device according to claim 5, wherein the pressure source is a compressed air source separate from a steam pressure source.

7. The frothing device according to claim 1, wherein at least one of steam, water, steam-air mixture, a cleaning agent and a flavoring agent is supplied through the air supply channel to the froth chamber, and wherein the flavoring agent is at least one of a cocoa and a syrup.

8. The frothing device according to claim 1, further comprising a control device, wherein the control device controls an air supply to the froth chamber as a function of at least one of a boiler pressure and an operating state of a heating device.

9. The frothing device according to claim 8, wherein the froth chamber dispenses at least one of a coffee drink and a chocolate drink. of at least one of a boiler pressure and an operating state of a heating device.

10. The frothing device according to claim 1, wherein the froth chamber dispenses at least one of a coffee drink and a chocolate drink.

11. A frothing device comprising:
a steam supply channel, which opens into a mixing chamber; a milk supply channel, which opens into the mixing chamber and an air supply channel, which opens into a froth chamber, wherein the mixing chamber is in communication with the froth chamber, wherein at least one of a steam, a water, a steam-air mixture, a cleaning agent and a flavoring agent is supplied through the air supply channel to the froth chamber.

12. The frothing device according to claim 11, wherein an adjustable air supply is provided to the froth chamber.

13. The frothing device according to claim 11, wherein a pressure source is provided for blowing free each of the steam supply channel and the adjustable air supply.

14. The frothing device according to claim 13, wherein the pressure source is a compressed air source separate from a steam pressure source.

15. The frothing device according to claim 11, further comprising a two-stage ejector pump, wherein the first stage occurs when the steam supply channel opens into the mixing chamber and the milk supply channel; and the second stage occurs with the air supply channel opening into-the froth chamber.

16. The frothing device according to claim 11, wherein the froth chamber dispenses at least one of a coffee drink and a chocolate drink.

17. A frothing device comprising:
a mixing chamber;
a steam supply channel, which opens into a mixing chamber;
a milk supply channel, which opens into the mixing chamber;
a froth chamber, the mixing chamber being in communication with the froth chamber;
an air supply channel, which opens into the froth chamber, and wherein a flavoring agent is supplied through the air supply channel to the froth chamber, and wherein the flavoring agent is at least one of a cocoa and a syrup; and
a two-stage ejector pump, wherein the first stage occurs when the steam supply channel opens into the mixing chamber and the milk supply channel, and the second stage occurs with the air supply channel opening into the froth chamber.

18. The frothing device according to claim 17, wherein a pressure source is provided for blowing free each of the steam supply channel and the adjustable air supply.

19. The frothing device according to claim 18, wherein the pressure source is a compressed air source separate from a steam pressure source.

20. The frothing device according to claim 19, wherein at least one of a steam, a water, a steam-air mixture, and a cleaning agent and a flavoring agent is supplied through the air supply channel.

* * * * *